United States Patent [19]

Yamagishi et al.

[11] 4,225,454
[45] Sep. 30, 1980

[54] ORTHO-CYANOPHENYL BIPHENYLCARBOXYLATE LIQUID CRYSTAL ESTERS AND MIXTURES THEREOF

[75] Inventors: Frederick G. Yamagishi, Newbury Park; Leroy J. Miller, Canoga Park; John E. Jensen, El Segundo; J. David Margerum, Woodland Hills, all of Calif.

[73] Assignee: Hughes Aircraft Company, Culver City, Calif.

[21] Appl. No.: 1,795

[22] Filed: Jan. 8, 1979

[51] Int. Cl.³ .............. C07C 121/60; C07C 121/75; C09K 3/34
[52] U.S. Cl. .............. 252/299; 260/465 D; 350/350 R
[58] Field of Search .............. 260/465 D; 252/299

[56] References Cited

U.S. PATENT DOCUMENTS

| | | | |
|---|---|---|---|
| 3,925,238 | 12/1975 | Gavrilovic et al. | 252/299 |
| 3,951,846 | 4/1976 | Gavrilovic et al. | 252/299 |
| 3,953,491 | 4/1976 | Steinstrasser et al. | 260/465 D |
| 4,017,416 | 4/1977 | Inukai et al. | 252/299 |
| 4,029,594 | 6/1977 | Gavrilovic et al. | 252/299 |
| 4,073,742 | 2/1978 | Erdmann et al. | 252/299 |

Primary Examiner—Dolph H. Torrence
Attorney, Agent, or Firm—Booker T. Hogan, Jr.; William MacAllister

[57] ABSTRACT

A number of alkyl and alkoxy-substituted ortho-cyanophenyl biphenylcarboxylate esters have been prepared for use as components for nematic liquid crystal mixtures which can be used in homeotropically aligned, field effect display devices or in dynamic scattering displays.

These materials have large negative dielectric anisotropies and high birefringence.

7 Claims, No Drawings

ORTHO-CYANOPHENYL BIPHENYLCARBOXYLATE LIQUID CRYSTAL ESTERS AND MIXTURES THEREOF

RELATED APPLICATIONS

U.S. Application Serial No. Ser. No. 973,464 filed December 26, 1978, for "Liquid Crystal Monomers Which Polymerize at Low Temperatures," by Applicants Jensen, Margerum and Miller herein is related to the subject matter of this application in that it discloses nematic liquid crystal monomers and various uses for liquid crystals. However, the compounds of this application are substantially and patentably different from the liquid crystal esters of the present invention.

FIELD OF THE INVENTION

This invention relates generally to the preparation of components for use in nematic liquid crystal mixtures and more particularly to the preparation of ortho-substituted cyanophenyl biphenylcarboxylate esters.

BACKGROUND OF THE INVENTION

Improved materials are required for the fabrication of high quality, liquid crystal, pictorial display panels. Materials have been sought which, when added to nematic liquid crystal mixtures, impart longer operational lifetimes, provide faster response times, increase the reflectivity of scattering displays, exhibit higher contrast ratios with minimum background scattering, show wider gray scale ranges preferably with a low voltage threshold for dynamic scattering mode (DSM) activation and increase the operational temperature range of the liquid crystal mixtures.

For field effect display devices, liquid crystal mixtures exhibiting a low viscosity and a high negative dielectric anisotropy as well as high birefringence are sought. The increased birefringence and low viscosity will allow construction of thinner and thus faster responding devices. As the negative dielectric anisotropy increases in its absolute value, the threshold voltage of a field-effect device decreases which correspondingly contributes to faster responding devices as well as longer operating lives.

Certain dopants have been employed to increase the positive dielectric anisotropy of liquid crystal mixtures utilized in field-effect devices such as watches. However, this technique has not been too successful for use in field-effect devices requiring a negative dielectric anisotropy.

DESCRIPTION OF THE PRIOR ART

There are several classes of organic compounds that possess both a negative dielectric anisotropy and a high birefringence. Among these are certain benzylideneanilines, stilbenes, azoxybenzenes, azobenzenes, tolanes and phenylbenzoate esters.

Aside from the last two of the above group, these materials are photochemically or thermally unstable and/or very sensitive to moisture.

The tolanes possess a small negative dielectric anisotropy and the phenylbenzoate esters have a substantially lower birefringence than that of the other classes listed.

The closest art relative to the present invention is contained in a sales brochure published by E. Merck of Darmstadt, Germany, which describes a cyanoheptylphenyl pentylbiphenylcarboxylate having the trade name S1014 Licristal. However, the Merck compound is different from the alkoxy compounds of this invention particularly in view of the fact that the present invention exhibits superior characteristics not suggested by the Merck compound.

SUMMARY OF THE INVENTION

A general purpose of this invention is to provide novel liquid crystal compounds which exhibit superior electro-optic characteristics, including high birefringence and a large negative dielectric anisotropy. These compounds are suitable for use in field effect display devices over a wide operating temperature range.

In seeking to achieve the above-stated general purpose and at the same time avoid the disadvantages of known prior art compounds, we have discovered a novel class of compounds whose general structures are:

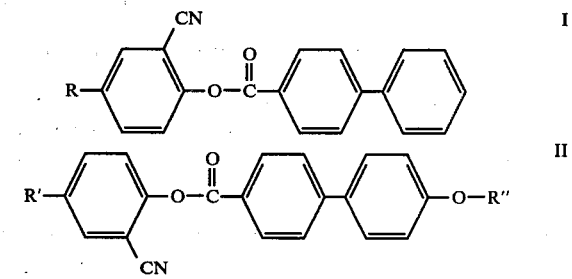

where R and R' and R" may be hydrogen, alkyl, or alkoxy groups. The alkyl groups have the formula $C_nH_{2n+1}$, and the alkoxy groups are $C_nH_{2n+1}O$ where n is an integer from 1 to 8.

Compounds of this invention exhibit large negative dielectric anisotropies, wide nematic ranges, high clear points, high birefringence and excellent chemical stability. They may be utilized with mixtures of nematic liquid crystal compounds to impart negative dielectric anisotropies to the mixtures.

It is therefore an objective of this invention to provide a novel class of ortho-substituted cyanophenyl biphenylcarboxylate esters.

A further objective of this invention is to provide ortho-substituted cyanophenyl biphenylcarboxylate esters which exhibit wide mesomorphic ranges and high clear points.

A still further objective of this invention is to provide biphenylcarboxylate esters which exhibit large negative dielectric anisotropies suitable for use in nematic liquid crystal mixtures and imparting said anisotropy to the mixture.

And, a still further objective of this invention is to provide ortho-substituted cyanophenyl biphenylcarboxylate esters which exhibit all of the above-stated advantages while avoiding the disadvantages of prior art materials.

The attainment of these objectives and other features will be apparent in the following detailed description of the invention.

DETAILED DESCRIPTION OF THE INVENTION

The alkyl and alkoxy-substituted ortho-cyanophenyl biphenylcarboxylate esters of this invention are suitable for use in dynamic scattering displays and field-effect display devices. They are particularly useful in field-effect display devices because they have a large negative dielectric anisotropy and a high birefringence. These characteristics can become dominant when the materials are added to liquid crystal mixtures that may be characterized as having a low negative dielectric anisotropy and birefringence.

As shown in the following formula, the dipole of the cyano group is directed mainly perpendicular to the molecular axis:

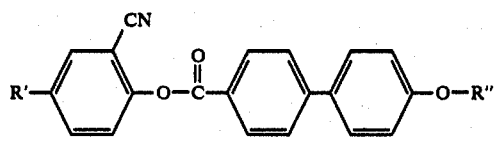

This characteristic is the reason for the large negative dielectric anisotropy. Additionally the use of the biphenyl group coupled with the alkoxy substitution allows for a greater degree of electron delocalization through conjugation along the molecular axis thereby increasing the birefringence.

We have prepared compounds of formula (I) where R is H and where R is $C_4H_9$. Similarly, compounds of formula (II) have been prepared where R' and R" are as follows:

| Compound No. | R' | R" |
|---|---|---|
| IIa | H | $CH_3$ |
| IIb | H | $C_3H_7$ |
| IIc | H | $C_5H_{11}$ |
| IId | $C_4H_9$ | $CH_3$ |
| IIe | $C_4H_9$ | $C_3H_7$ |
| IIf | $C_4H_9$ | $C_5H_{11}$ |

The esters were prepared from the corresponding acyl chlorides and ortho-cyanophenol. The compound 2-cyano-4-butylphenol was prepared by the Reimer-Tiemann reaction followed by oxidative conversion of the aldehyde to a nitrile. Thus, 4-butylphenol was treated with chloroform in an alcoholic sodium hydroxide solution. The crude aldehyde was used without further purification and treated with hydroxylamine hydrochloride in formic acid to give the product as a white solid, mp 58°-61° C.

The alkoxybiphenylcarbonyl chlorides were prepared as follows: Phenylphenol was alkylated with methyl or propyl iodide in a sodium hydroxide methanolic solution. These products were, in turn, acetylated with acetyl chloride in methylene chloride in the presence of aluminum chloride. Oxidation of the ketone with sodium hypobromite gave 4-(p-methoxyphenyl)-benzoic acid and 4-(p-propoxyphenyl)benzoic acid. The compound 4-(p-pentoxyphenyl)-benzoic acid was obtained by base catalyzed hydrolysis of 4-(p-pentoxyphenyl)-benzonitrile. The acyl chlorides were prepared by treatment of the acid with thionyl chloride. A specific process for preparing Compound IIf, our preferred species, is shown below.

EXAMPLE 1

Into a 2000-ml flask was added 4-(p-pentoxyphenyl)-benzoic acid (13.8 g, 0.049 mol), 50 ml of thionyl chloride and 1000 ml of toluene. The mixture was heated to reflux for 3 hours after which the excess thionyl chloride was removed by distillation. The remaining solution was cooled to room temperature and added to a solution of 2-cyano-4-butylphenol in 100 ml of pyridine. After stirring overnight, the solvent was removed under a stream of nitrogen and the resulting solid was dissolved in 800 ml of methylene chloride which was washed with 10% hydrochloric acid, water, 5% sodium hydroxide and water. The solution was dried over anhydrous sodium sulfate and the solvent removed in vacuo to give a brown solid. This was chromatographed on silica gel (hexane eluant) and the product recrystallized from hexane to give 5 g of white needles, mp 80.0°-80.6° C., clpt 125.8°-126.3° C.

Anal. Calcd for $C_{29}H_{31}NO_3$: C, 78.88; H, 7.08; N, 3.17. Found: C, 78.84; H, 7.15; N, 3.19.

The other esters were prepared in a similar manner. Their melting and clearing points are listed below.

| Compound | mp, °C. | clpt, °C. |
|---|---|---|
| Ia | 145.7-147.8 | — |
| Ib | 97.9-98.3 | 51.2 |
| IIa | 151.9-154.7 | 120 |
| IIb | 100.5-102.1 | 98.2 |
| IIc | 97.9-105.2 | 89.8 |
| IId | 98.6-101 | 160 |
| IIe | 102.7-108.7 | 137 |
| IIf | 80.0-80.6 | 125.8-126.3 |

Example 2 shows the effect of forming a mixture with compounds of this invention and other nematic liquid crystal compounds.

EXAMPLE 2

A nematic liquid crystal mixture of two tolanes (p-methoxy-p'-pentyltolane (10≡5), 48.56 mole percent, $\Delta\epsilon = +0.11$ at 50°; and p-propoxy-p'-heptyltolane (30≡1) 51.44 mole percent, $\Delta\epsilon = +0.19$ at 50°) has a nematic range of 5.4°-60.1° C. and a positive dielectric anisotropy. A mixture prepared with these two compounds along with compound IIf (10≡5, 47.39 mole percent; 30≡7, 43.67 mole percent; and IIf, 8.94 mole percent) had a clearing point of 67.0° C. and a dielectric anisotropy of −0.28. The materials did not crystallize and therefore no melting point could be obtained.

The above-stated examples are typical compositions that have been shown to be suitable for use in field-effect electro-optic devices. Therefore, our invention is not intended to be limited to the compositions shown or to the use of these compositions in field-effect devices. The compositions are suitable for use in all electro-optic devices requiring a large negative dielectric anisotropy, high birefringence and good chemical stability.

Having completely disclosed our invention and provided teachings to enable others to make and utilize the same, the scope of our claims may now be understood as follows.

What is claimed is:

1. Alkyl and alkoxy-substituted ortho-cyanophenyl biphenylcarboxylate esters whose structural formula are:

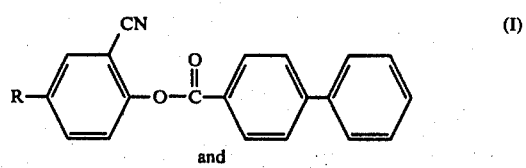

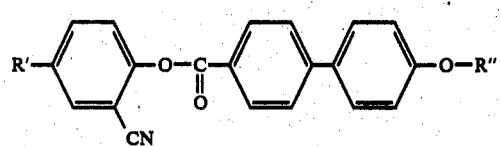

wherein R and R' are hydrogen or an alkyl group of the formula $C_nH_{2n+1}$ and R" is an alkyl group of the formula $C_nH_{2n+1}$ where n ranges from 1 to 8.

2. A compound of claim 1 whose structure is I and R is hydrogen.

3. A compound of claim 1 whose structural formula is I and R is $C_4H_9$.

4. A compound of claim 1 whose structure is II and R' and R" are defined in claim 1.

5. A compound of claim 4 wherein R' is $C_4H_9$ and R" is $C_5H_{11}$.

6. A nematic liquid crystal mixture exhibiting a high birefringence and a large negative dielectric anisotropy comprising a compound whose formula is

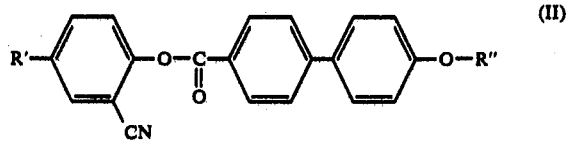

wherein R' and R" are alkyl groups whose formula are $C_nH_{2n+1}$ where n ranges from 1 to 8, which possess a large negative dielectric anisotropy, and a nematic liquid crystal mixture that possesses a positive dielectric anisotropy.

7. A liquid crystal mixture of claim 6 wherein said positive dielectric anisotropy mixture is comprised of p-methyoxy-p'-pentyltolane and p-propoxy-p'-heptyltolane.

* * * * *